E. J. BERG.
PARALLEL OPERATION OF ROTARY CONVERTERS AND STORAGE BATTERIES.
APPLICATION FILED SEPT. 13, 1907.
916,981.    Patented Apr. 6, 1909.
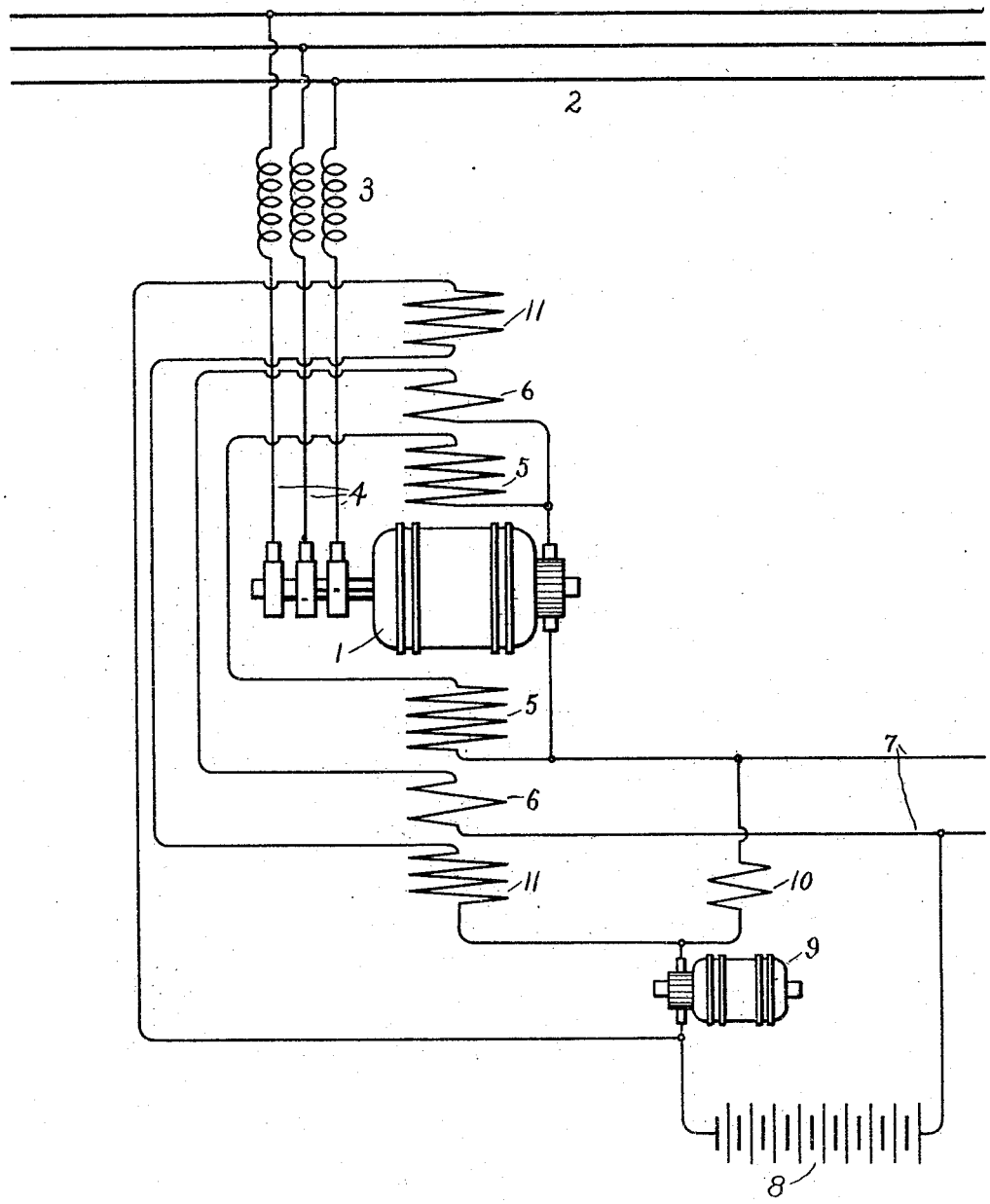
Witnesses:
Carl G Klock.
J. Ellis Glen.
Inventor:
Ernst J. Berg,
by Albert G Davis
Atty.

UNITED STATES PATENT OFFICE.

ERNST J. BERG, OF SCHENECTADY, NEW YORK, ASSIGNOR TO GENERAL ELECTRIC COMPANY, A CORPORATION OF NEW YORK.

PARALLEL OPERATION OF ROTARY CONVERTERS AND STORAGE BATTERIES.

No. 916,981. Specification of Letters Patent. Patented April 6, 1909.

Application filed September 13, 1907. Serial No. 392,630.

*To all whom it may concern:*

Be it known that I, ERNST J. BERG, a citizen of the United States, residing at Schenectady, county of Schenectady, State of New York, have invented certain new and useful Improvements in the Parallel Operation of Rotary Converters and Storage Batteries, of which the following is a specification.

This invention relates to a system of electrical distribution in which the load-circuit is supplied with current from a rotary converter and a storage battery connected in parallel and operating in conjunction with a booster.

The object aimed at is to enable the storage battery to be used on normal loads to assist in carrying the load, while on light loads the battery will be charged, and on excessive loads the rotary alone will carry the excess, and the battery will be saved from an injurious strain. With this end in view, the rotary converter is provided not only with the customary shunt field winding and series field winding, but also with an auxiliary field winding which is excited by the booster. The booster is series-excited and therefore its potential will vary with the load, and consequently the excitation of the auxiliary field will similarly vary. With an increasing load on the system, the potential of the rotary must decrease in company with that of the storage battery, so that the combined supply of current from these two sources, feeding in parallel, may be most efficient and free from cross currents. This means that the excitation of the rotary must be diminished, and, therefore, the auxiliary field is excited in opposition to the main field. On the contrary, when the load is light, the storage battery is charged by the rotary converter, and at this time the excitation of the rotary should be strengthened, which means that the polarity of the booster must be reversed, in order that the current in the auxiliary field winding may assist that in the main winding.

The accompanying drawing is a diagram of circuits embodying my invention.

A rotary converter 1 is supplied with alternating-current from the three-phase line 2, with the usual reactance coils 3 in the leads 4. The rotary has a shunt field winding 5 and a series field winding 6 in circuit with its direct-current end. The load-circuit is shown at 7, and across these mains is connected a storage battery 8. A suitably-driven booster 9 is placed in series with the battery, having a field winding 10 in series with said battery. The booster also supplies current to a circuit containing an auxiliary winding 11, connected across the booster brushes and located on the field frame of the rotary converter in proximity to its windings 5 6.

On light loads the excitation of the field of an ordinary compound-wound rotary due to the series winding is lessened, and as the shunt winding is usually wound to give an under excitation at low loads or no load, the result is that a lagging current is produced in the armature, which, owing to the inductance of the circuit, has the effect of lowering the potential of the direct-current. But when a storage battery forms a part of the supply system, as in the present case, it is desirable when the load is low to generate an excess of current for charging the battery. In order to do this, the potential of the charging circuit must be as high as, or higher than usual. The system I have shown and described effects this maintenance of the potential. The storage battery takes the excess of current over what is needed to carry the load on the mains, and is itself an additional load. The current which flows into the battery energizes the field winding 10 of the booster, which is so wound that it raises the potential of the charging current. Moreover, the flow of the booster-current in the auxiliary winding 11 is in such a direction that it acts in conjunction with the main windings to strengthen the excitation of the rotary and thus maintain the potential on the load-circuit. But when the load becomes heavier, the battery will begin to discharge and assist the rotary to carry the load. As the direction of the discharging current is opposite to that of the charging current, the polarity of the booster will be reversed, so that the coil 11 will operate in opposition to the main windings and produce a decrease in the excitation of the rotary. As the load increases, and the flow of current from the battery is correspondingly increased, the booster-current in the auxiliary coil becomes stronger, and the decrease in excitation of the rotary becomes greater, so that the potential of the direct-current generated by the rotary gradually diminishes as the load increases; a result which corresponds with the action of the storage battery. The rotary and the battery thus operate harmoniously in caring for the increasing load. Inasmuch, however, as the booster depends upon the storage battery for its excitation, and as the magnetism in the poles and therefore its voltage is limited, the counter-excitation of the main field cannot exceed a certain value. If, therefore, the demand upon the system exceeds the maximum which the battery can give without mechanical damage, the excess load must be carried by the rotary. As soon as this point is reached, the excitation of the main field will begin to strengthen, and since a stronger field means a more leading or less lagging current in the armature, the potential of the direct-current will begin to rise slightly. It appears, therefore, that by my invention I provide for, first, charging the battery on a light load, second, operating the battery and rotary in parallel to care for an increasing load up to a given point, and third, relieving the battery automatically from such excessive load as would cause mechanical damage.

What I claim as new and desire to secure by Letters Patent of the United States, is—

1. The combination of a source of current having a main field winding, a direct-current distributing circuit, a storage battery connected across said circuit, a booster in series with said battery, and an auxiliary winding for said source in circuit with said booster, said winding acting to strengthen the main field in case of light load on the distributing circuit, but weakening said field in case of a heavy load on said distributing circuit.

2. The combination of a source of current having a main field winding, a direct-current distributing circuit receiving energy therefrom, a storage battery, and a booster in circuit with said storage battery and coöperating with an auxiliary field winding on said current source to insure charging of the battery when the load on the distributing circuit is light and to prevent excessive discharge from the battery when the load on the distributing circuit becomes heavy.

3. The combination of a source of current having a main field winding and an auxiliary field winding, a distributing circuit receiving energy from said source, a storage battery connected across said distributing circuit and means coöperating with said battery and said auxiliary winding to insure charging of the battery when the load on the distributing circuit is light and to prevent excessive discharge from the battery at all times.

4. The combination with an alternating-current supply system, of a rotary converter, a direct-current distributing system, a storage battery connected with said direct-current system, and means for causing the potential of the rotary to decrease with that of the battery when both are operating in parallel.

5. The combination with an alternating-current supply system, of a rotary converter, a direct-current distributing system, a storage battery connected across the direct-current mains, a booster in series with said battery, and an auxiliary field winding on the rotary in circuit with said booster.

6. The combination with an alternating-current supply system, of a rotary converter, a direct-current distributing system, a storage battery connected across the direct-current mains, a booster in series with said battery, and an auxiliary field winding on the rotary in circuit with said booster, said winding acting in conjuction with the main field when the battery is charging, and in opposition when the battery is discharging.

7. The combination with a rotary converter, of an auxiliary field winding, a storage battery, and means for reversing the current in said auxiliary winding when the current through the battery reverses.

8. The combination with a rotary converter, of a storage battery adapted to operate in parallel therewith, and means for causing the rotary to carry all excess of load above a certain value.

9. The combination with a rotary converter, of a storage battery adapted to operate in parallel therewith, and means for strengthening the excitation of the field of the rotary on a light load to provide current for charging the battery.

10. The combination with a rotary converter, of a storage battery adapted to operate in parallel therewith, a booster in series with said battery, and means for varying the excitation of the field of the rotary in accordance with the direction of the flow of current in said battery circuit.

In witness whereof, I have hereunto set my hand this 11th day of September, 1907.

ERNST J. BERG.

Witnesses:
BENJAMIN B. HULL,
BERTHA SECOR,